(12) United States Patent
Peer

(10) Patent No.: US 12,071,939 B2
(45) Date of Patent: Aug. 27, 2024

(54) FLUID END PACKING ASSEMBLY

(71) Applicant: SPM Oil & Gas Inc., Fort Worth, TX (US)

(72) Inventor: Richard David Peer, Fort Worth, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 291 days.

(21) Appl. No.: 17/438,919

(22) PCT Filed: Mar. 13, 2020

(86) PCT No.: PCT/US2020/022779
§ 371 (c)(1),
(2) Date: Sep. 13, 2021

(87) PCT Pub. No.: WO2020/186225
PCT Pub. Date: Sep. 17, 2020

(65) Prior Publication Data
US 2022/0186718 A1 Jun. 16, 2022

Related U.S. Application Data

(60) Provisional application No. 62/818,074, filed on Mar. 13, 2019.

(51) Int. Cl.
*F16J 15/3204* (2016.01)
*F04B 15/02* (2006.01)
(Continued)

(52) U.S. Cl.
CPC ............ *F04B 15/02* (2013.01); *F04B 53/02* (2013.01); *F04B 53/164* (2013.01); *F04B 53/18* (2013.01); *F16J 15/006* (2013.01); *F16J 15/3204* (2013.01)

(58) Field of Classification Search
CPC ...... F16J 15/006; F16J 15/3204; F04B 15/02; F04B 53/02; F04B 53/164; F04B 53/18
See application file for complete search history.

(56) References Cited

U.S. PATENT DOCUMENTS 2,155,628 A    4/1939   Willaims
2,637,413 A *  5/1953   Fox ......................... F16N 27/00
                                                          137/848
(Continued)

OTHER PUBLICATIONS

International Search Report and Written Opinion received in Patent Cooperation Treaty Application No. PCT/US2020/022779, dated May 22, 2020, 8 pages.

*Primary Examiner* — Gilbert Y Lee

(57) ABSTRACT

A seal packing assembly for a hydraulic pump includes a plurality of annular dynamic seals disposed within annular grooves circumferentially defined in the annular bore, a packing gland circumferentially housing a section of the plunger, and a plurality of seal manifolds distributed and defined within the packing gland, each seal manifold defining a port at one end exposed to the pumping fluid and further defining a clean lubrication fluid inlet proximate to a second end, the fluid inlet coupled to a lube pump via a check valve, where the clean lubrication fluid housed in the seal manifolds is maintained at a constant pressure. Each seal manifold includes a piston disposed within the seal manifold having a first end configured with a first surface area to interface with the pumping fluid and a second end configured with a second surface area to interface with the clean lubrication fluid, and a fluid port configured to provide fluid communication between the seal manifold and the annular grooves of the annular dynamic seals.

19 Claims, 9 Drawing Sheets

(51) Int. Cl.
*F04B 53/02* (2006.01)
*F04B 53/16* (2006.01)
*F04B 53/18* (2006.01)
*F16J 15/00* (2006.01)

(56) References Cited

U.S. PATENT DOCUMENTS 3,542,374 A 11/1970 Neilson et al.
3,785,659 A 1/1974 Maurer et al.
6,302,401 B1 10/2001 Palmour \* cited by examiner

FLUID END PACKING ASSEMBLY

CROSS-REFERENCE TO RELATED APPLICATION

This application is a national phase application of Patent Cooperation Treaty Application No. PCT/US2020/022779 filed Mar. 13, 2020, which claims priority to U.S. Provisional Application No. 62/818,074 filed Mar. 13, 2019, which is incorporated herein by reference in their entirety.

FIELD

The present disclosure relates to hydraulic fracturing pumps, and in particular, to a novel fluid end packing assembly for a plunger.

BACKGROUND

Hydraulic fracturing (a.k.a. fracking) is a process to obtain hydrocarbons such as natural gas and petroleum by injecting a fracking fluid or slurry at high pressure into a wellbore to create cracks in deep rock formations. The hydraulic fracturing process employs a variety of different types of equipment at the site of the well, including one or more positive displacement pumps, slurry blender, fracturing fluid tanks, high-pressure flow iron (pipe or conduit), wellhead, valves, charge pumps, and trailers upon which some equipment are carried.

Positive displacement pumps are commonly used in oil fields for high pressure hydrocarbon recovery applications, such as injecting the fracking fluid down the wellbore. A positive displacement pump typically has two sections, a power end and a fluid end. The power end includes a crankshaft powered by an engine that drives the plungers. The fluid end of the pump includes cylinders into which the plungers operate to draw fluid into the fluid chamber and then forcibly push out at a high pressure to a discharge manifold, which is in fluid communication with a well head. A seal assembly, also called a packing assembly or stuffing box, disposed in the cylinder chamber of the pump housing is used to prevent leakage of frac fluid from around the plunger during pumping operations.

DETAILED DESCRIPTION

Figure 8:
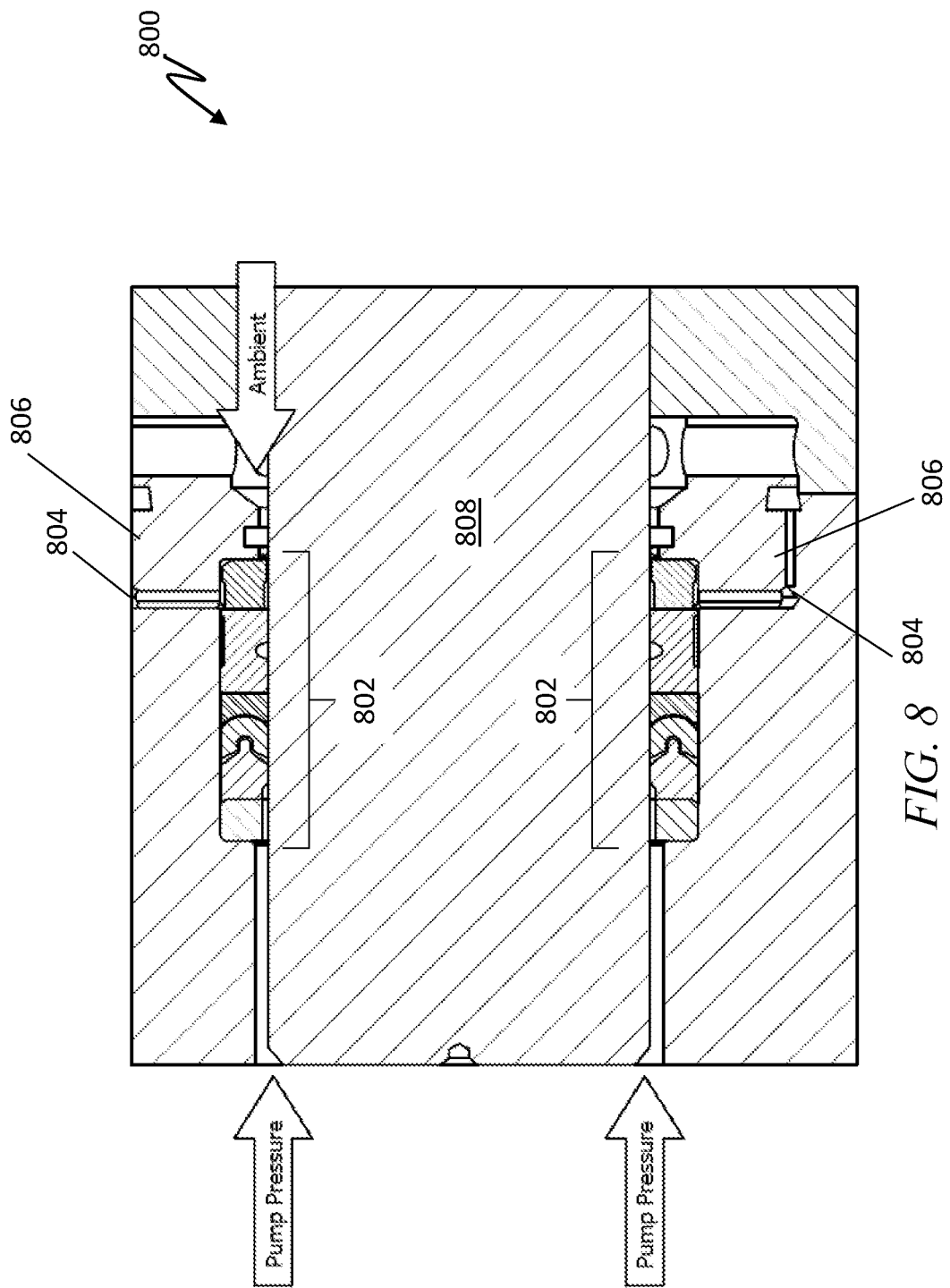
FIG. 8 is a partial cross-sectional side view of a conventional packing assembly.

Current seal packing technology 800, an example of which is shown in FIG. 8, utilizes a single packing system 802 composed of different types of metallic and/or elastomer seals packed together next to each other with a lubrication inlet 804. This seal stack 802 is energized by a packing nut 806 that preloads the seal to insure positive engagement with the plunger 808. The pumping pressure then further energizes the packing stack 802. The packing stack (elastomers and/or metallic components) 802 is subjected to full differential pressure loading. As the preloading is removed, the seal can move with the plunger and/or lose low pressure energizing after the seal starts to wear. This conventional system allows for the seal to remain lubricated (via the lubrication inlet 808) during the linear motion of the plunger 806, but does not act as a dynamic energizer of the packing stack 802 to maintain seal engagement through a range of pressures during operation.

This conventional packing assembly 800 leaves something to be desired. Because the packing seals require mechanical compression exerted by the packing nut 806 to energize or pre-load the seal to ensure a constant contact with the plunger and seal bore, the seals can wear prematurely if the packing nut is not maintained properly. As the seals wear, fracking fluids and debris can leak to the environment and require a more frequent maintenance schedule. Further, due to the cyclic nature of the pressure acting on the packing stack, the seals can move back and forth on the seal bore causing wear in the metallic seal bore, known as packing bore wash or washboarding. This type of wear is detrimental and requires significant labor and cost to repair, with the worst scenario requiring a complete replacement of the pump fluid end. As the current packing wears (or loses its energization), the plunger may be subject to jetting or premature wear. The cost and time lost to remove or replace the plunger is a heavy burden to the end user.

Figure 1:
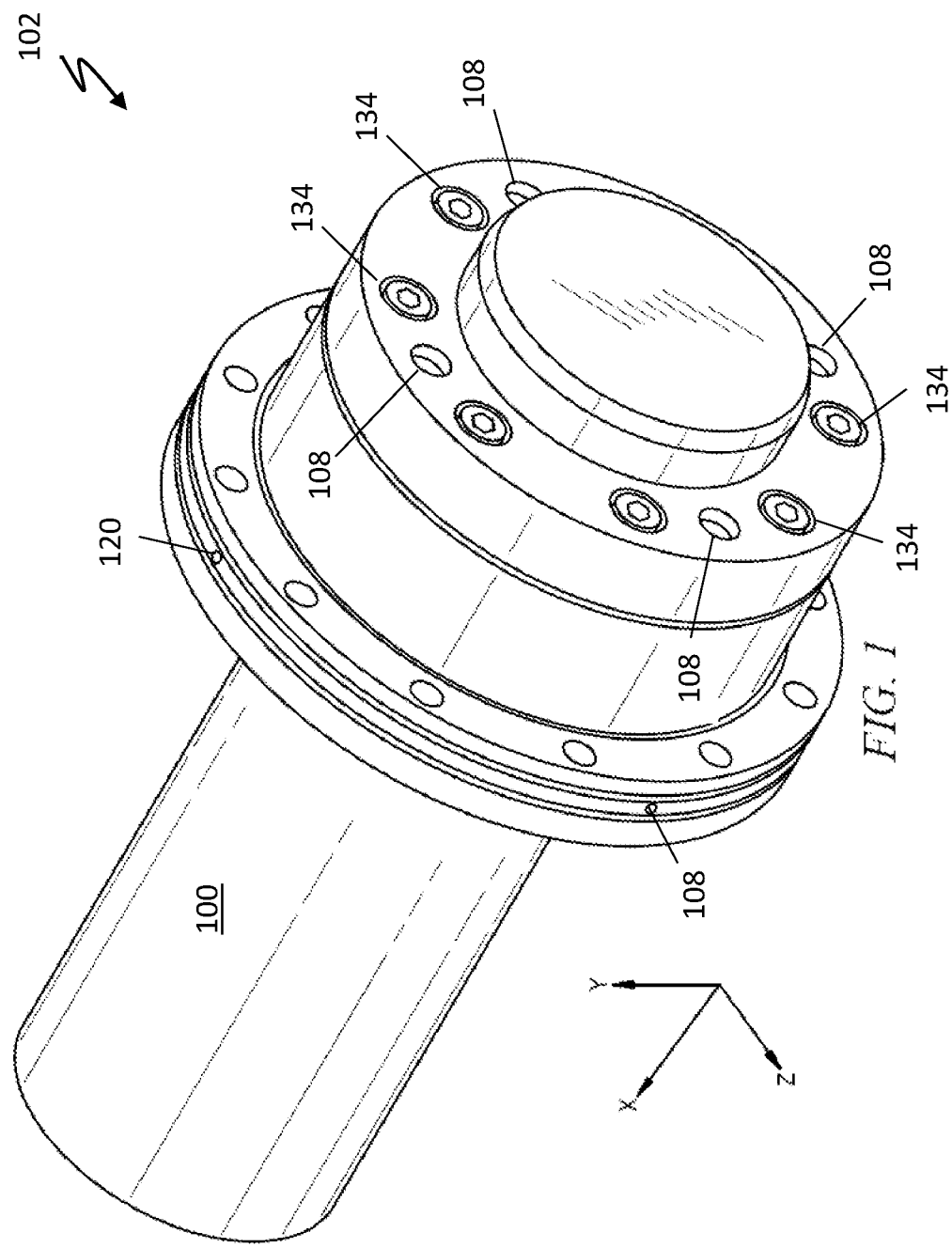
FIG. 1 is a perspective view of an exemplary embodiment of a plunger with a novel packing assembly for the fluid end of a positive displacement frac pump according to the teachings of the present disclosure.
Figure 2:
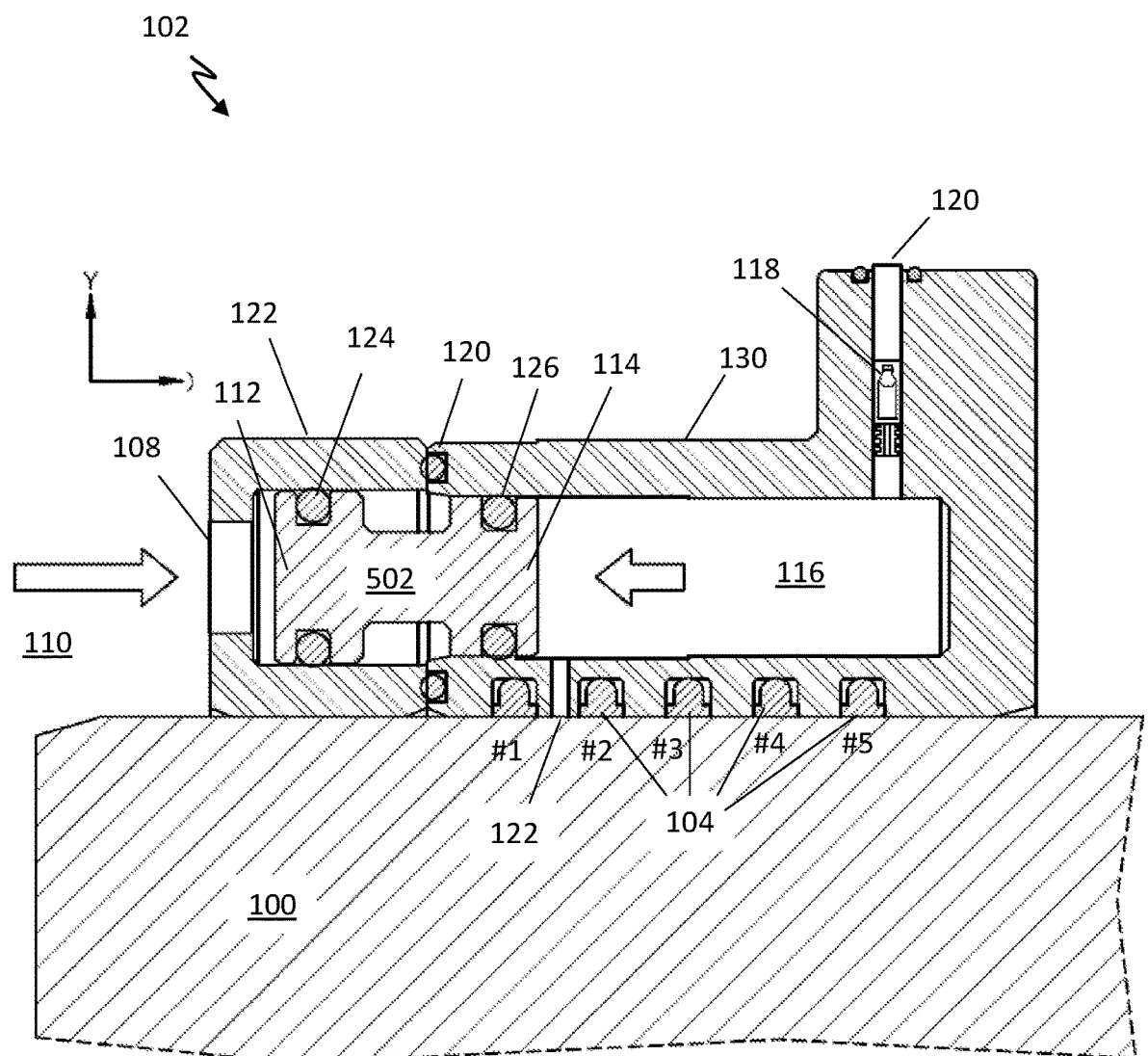
FIG. 2 is a partial cross-sectional side view (along the x-y plane) showing a +5% piston of a novel packing assembly for a plunger in the fluid end of a positive displacement frac pump according to the teachings of the present disclosure.
Figure 3:
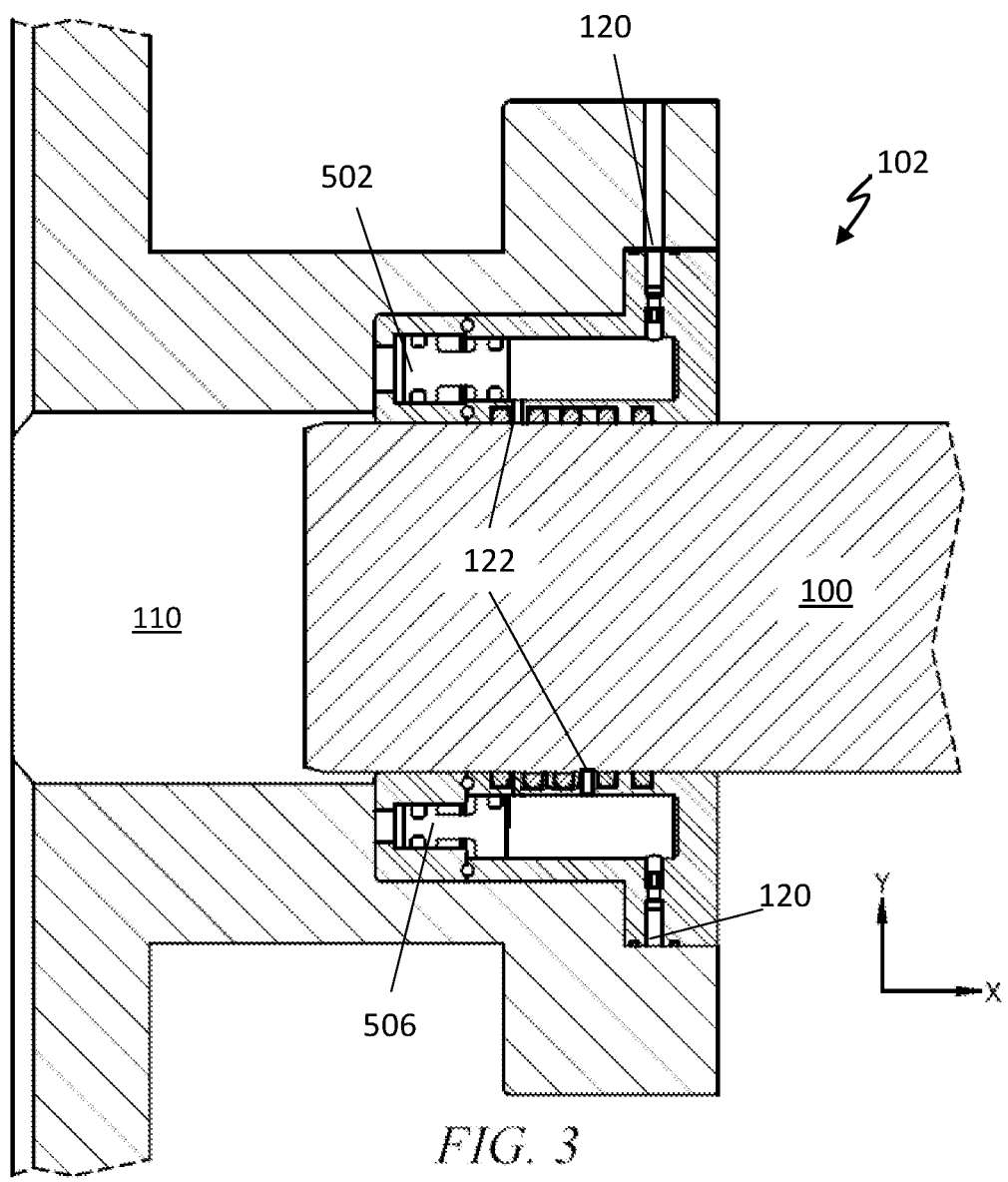
FIG. 3 is another partial cross-sectional side view (along the x-y plane) showing a +5% and a −60% piston of a novel packing assembly for a plunger in the fluid end of a positive displacement frac pump according to the teachings of the present disclosure.
Figure 4:
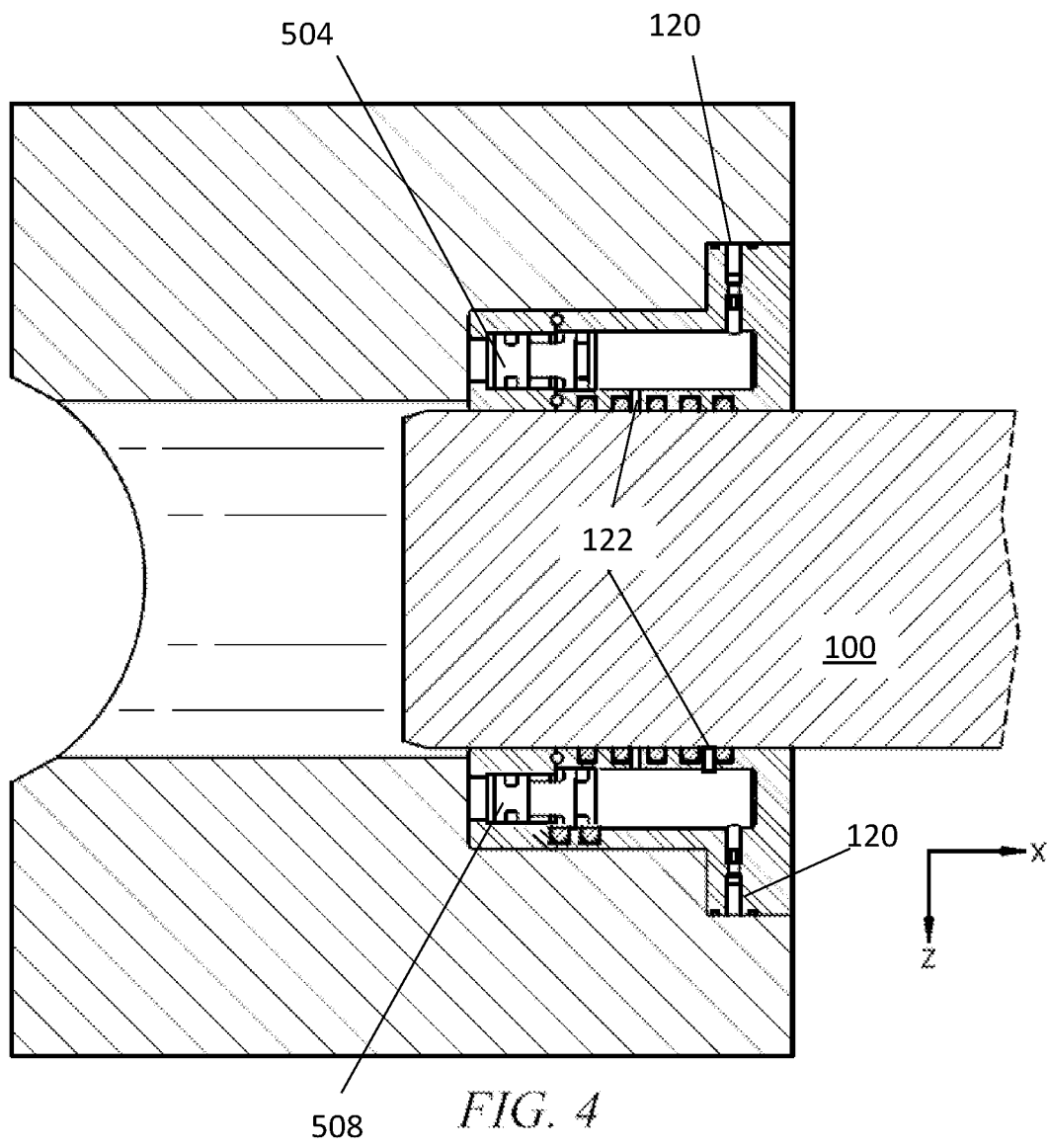
FIG. 4 is another partial cross-sectional side view (along the x-z plane) showing a −30% and a −75% piston of a novel packing assembly for a plunger in the fluid end of a positive displacement frac pump according to the teachings of the present disclosure.
Figure 5:
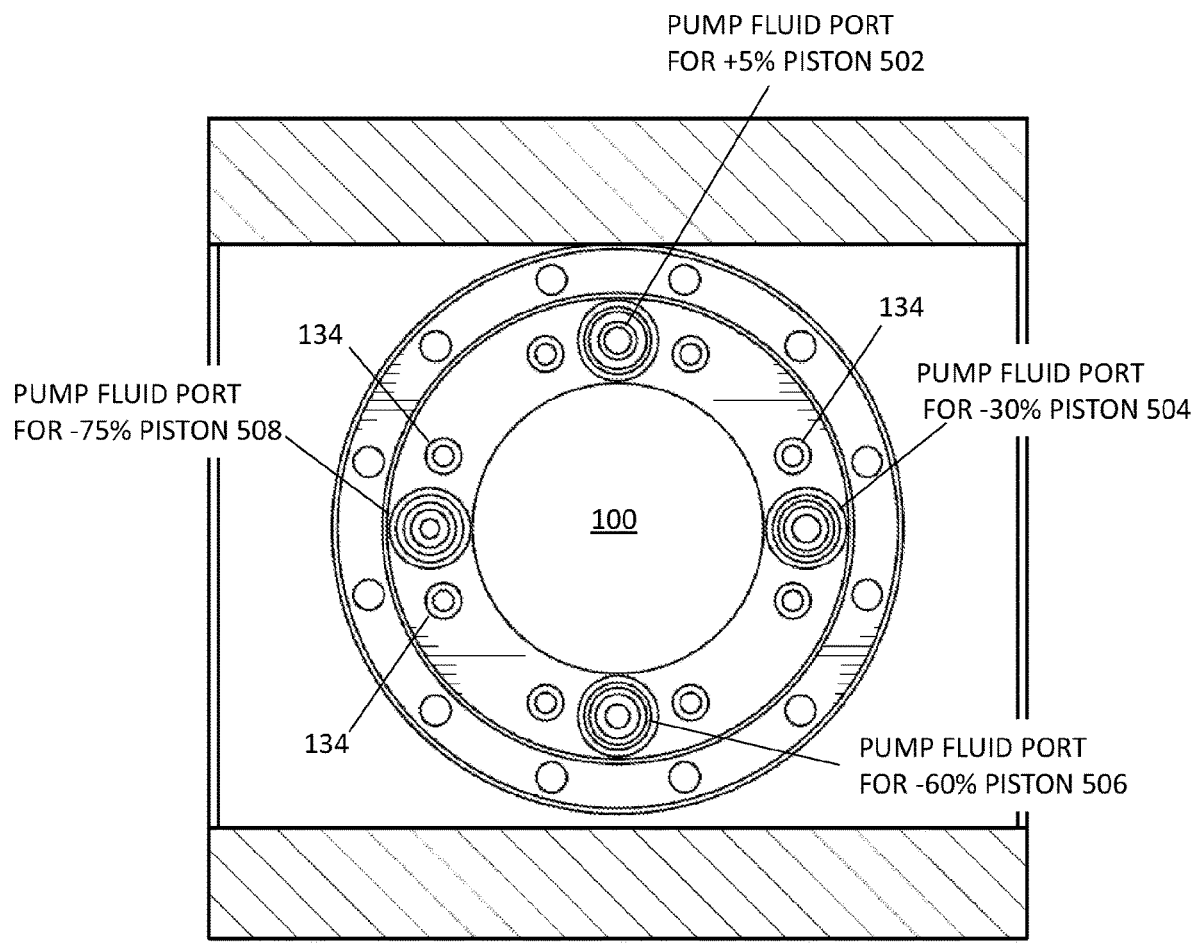
FIG. 5 is another partial cross-sectional side view (along the y-z plane) showing all four pistons at +5%, −30%, −60%, and −75% of a novel packing assembly for a plunger in the fluid end of a positive displacement frac pump according to the teachings of the present disclosure.
Figure 6:
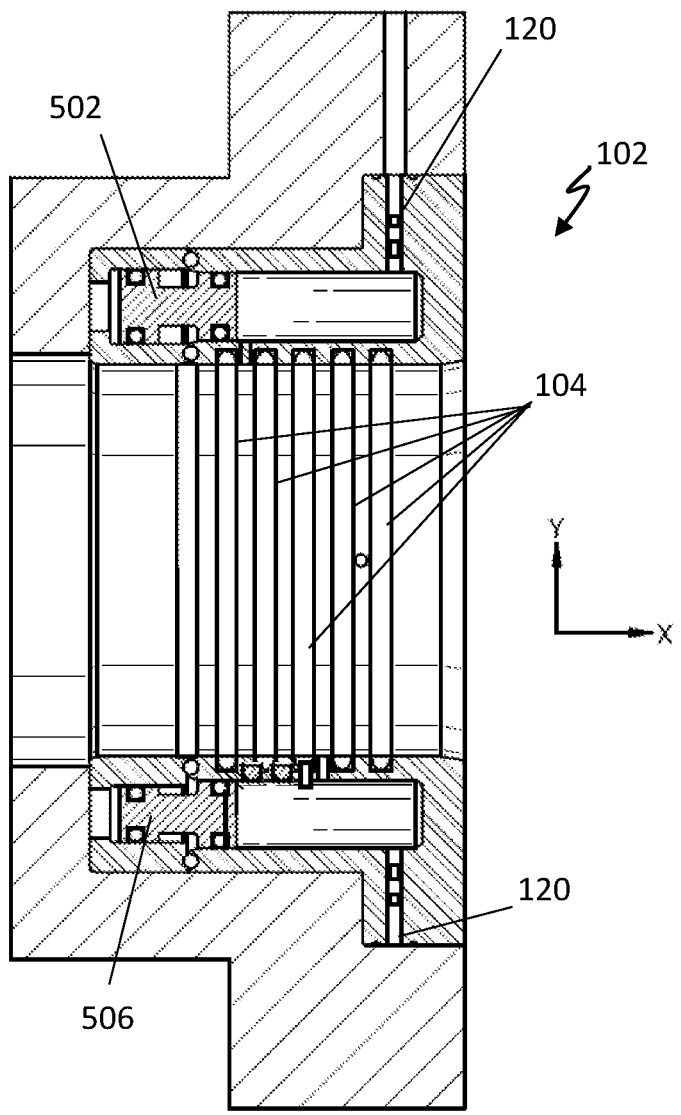
FIG. 6 is a partial cross-sectional side view (along the x-y plane) showing a +5% piston of a novel packing assembly without the plunger for the fluid end of a positive displacement frac pump according to the teachings of the present disclosure.
Figure 7:
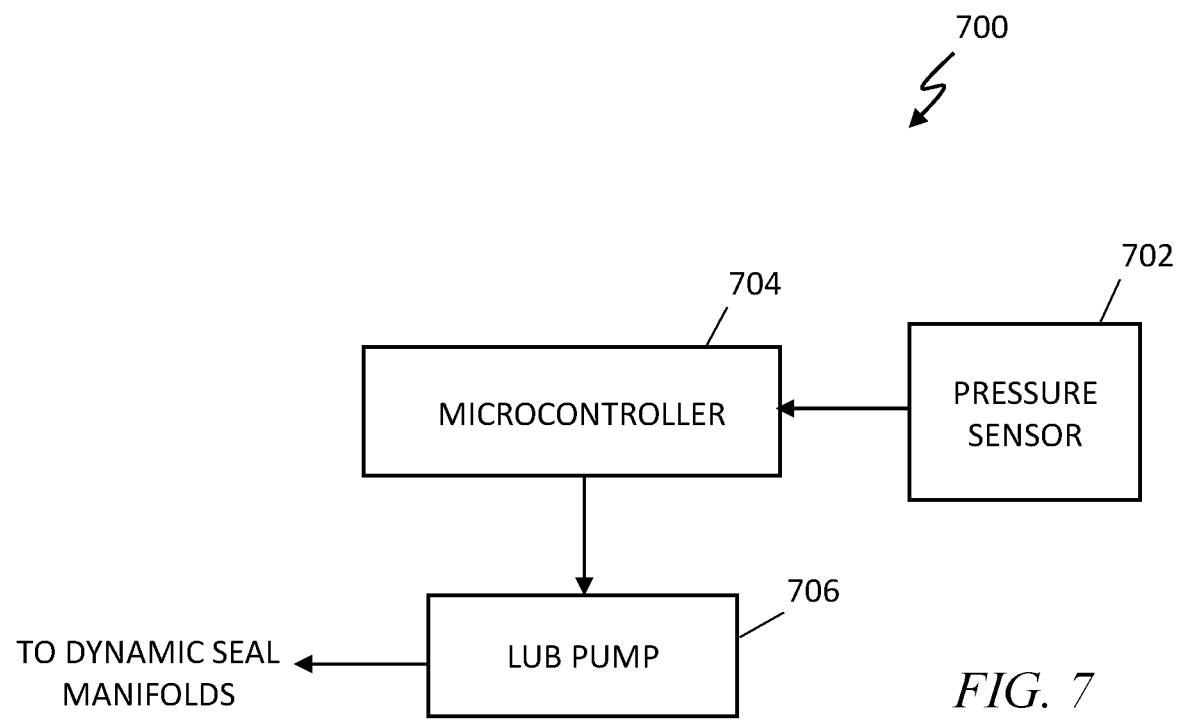
FIG. 7 is a simplified block diagram of an example system for controllably monitoring and controlling the clean lubrication fluid pressure according to the teachings of the present disclosure.

FIGS. 1-7 are various views of an exemplary embodiment of a plunger 100 with a novel packing assembly 102 for the fluid end of a positive displacement frac pump (shown in FIG. 9) according to the teachings of the present disclosure. The novel packing assembly 102 uses multiple pistons 502-508 disposed about the plunger 100. The novel packing assembly 102 includes a number of dynamic seals 104 that are disposed about the plunger 100. One novel aspect of this packing assembly 102 is the staged pressure between annular dynamic sealing elements 104 that are much smaller than the seals in the conventional packing stack. The first dynamic seal #1 has a "back side" pressure higher than the pumping fluid side pressure. The first dynamic seal #1 would be immobile due to the pressure cycle of the pump and would allow for clean lubricant fluid to be present at the plunger-seal engagement surface. The remaining seals #2, #3, . . . #n would experience reduced differential pressures based on the geometric configuration (i.e., diameter) of the pressure compensating pistons 502-508 disposed about the plunger, as shown in FIG. 5. The use of multiple pistons 502-508 disposed about the plunger 100 where each of which having one end exposed to the pumping pressure via a respective pump fluid inlet 108. As the pump fluid 110 is energized (pressurized from action of the plunger), the pump fluid pressure acts on one end 112 of each of the pistons, creating a force on the pistons along the x axis. The other end 114 of each of the pistons 502 acts on the clean lubrication fluid in the piston manifold 116 of the circuit. The surface area of the piston end 114 exposed to the clean lubrication fluid is different from the surface area of the piston end 112, which means that there exists a pressure differential between the pump side and the lubrication side of the piston 502. The pump fluid side of the pistons 502-508 have all different surface areas. A high-pressure check valve 118 at the lubricating fluid inlet 120 of each piston 502-508 allows a clean lubricating fluid to be introduced at a high pressure (using a lube pump) into the piston manifold 116 of the packing assembly 102, so that the clean lubrication fluid is maintained at a high pressure that acts on the piston 502 and forces the piston back towards the pump fluid side along the −x axis. The lubrication pump maintains a constant flow of pressurized clean lubricating fluid to the seal manifold 116 via the fluid inlet 120 and the dynamic seals 104 via the fluid port 122, while the check valve 118 prevents the pumping fluid (frac fluid) from being introduced into the clean lubricant side of the circuit.

At least two annular sealing elements 124 and 126 are disposed in annular grooves formed circumferentially about the pistons 502-508 to help to ensure that the pump fluid does not enter the seal manifold 116 and contaminate the clean lubrication fluid therein. The pistons 502-508 are housed within a piston housing 130 and a cap 132 that are securely fastened using, for example, threaded fasteners 134. An annular seal 136 is disposed, at each piston, in the interface between the housing 130 and cap 132.

This novel packing assembly 102 does not require a packing nut to pre-load or energize a packing stack. Instead, this system includes a set of dynamic seals 104 that are pressurized by a clean lubricating fluid at all times, which minimizes the requirement for frequent service.

The novel packing assembly 102 described herein includes a novel piston pressure compensator. By using the pumping side pressure and a pressure reducer/multiplier piston 502 to charge the first seal chamber #1 above the pumping pressure. Multiple seal chambers separated by dynamic seal elements 104 have progressive pressure reduction (percentage, absolute value, etc.) to reduce the pressure differential across each seal to minimize seal stress and wear, so that no seal experiences pressure at its maximum rating. This can be best seen in FIG. 5. The piston pressure differential values are at, for example, +5%, −30%, −60% and −75%. This system uses internal pressure multiplying/reducing piston geometries that are dynamically energized by each pumping cycle. The surface area of the piston end facing the pump fluid pressure of the pistons are all different to create the pressure differential among them. Therefore, no mechanical compression using a packing nut is needed as in conventional seal packing arrangements.

This novel packing assembly 102 includes a fixed pressure manifold 116 by using a fixed, high pressure lubrication pump 706 (FIG. 7) that feeds a clean lubricating fluid manifold 116 via the lubrication inlet 120 that has a check valve 118. Using a fixed pressure lubrication pump 706 and a manifold that has a fluid with a fixed pressure input, pressure reducing components may apply variable pressures between seal chamber #1, chamber #2, chamber #3, chamber #4, . . . chamber #n. In the embodiment shown, five dynamic seals are implemented. Each circuit on the manifold feeds an individual port 122 corresponding to the appropriate pressure chamber between the dynamic seals. As shown in FIG. 3, the fluid port is between dynamic seals #1 and #2 at the +5% piston, and the fluid port is between dynamic seals #3 and #4 at the −60% piston. As shown in FIG. 4, the fluid port is between dynamic seals #2 and #3 at the −30% piston, and the fluid port is between dynamic seals #4 and #5 at the −75% piston. At all points in the pumping cycle, the pressures in each chamber remains constant, regardless of the active pumping pressure. This system would have a constant pressure/supply of clean high-pressure lubrication fluid in all the seal chambers, regardless of where it is in the pump pressure cycle.

The novel packing assembly includes a system 700 includes a pressure transducer 702 that measures the pump cylinder pressure, and the pressure data is provided or transmitted to a microcontroller 704 that is configured to controllably adjust a variable pressure lubrication pump 706 to a predetermined pressure setting for the lubrication that feeds the dynamic seal chambers and manifolds. As the pumping pressure increases, the pressure transducer 702 sends the pressure signal to the microcontroller 704 that regulates the pressure of the lubrication fluid provided to the dynamic seals, and to enter the dynamic seal chamber of the packing assembly at a given pressure. This pressure can be multiplied or reduced, depending on which dynamic seal chamber is being fed. As the pump cycle concludes, the cylinder pressure decreases and the lubrication pressure is reduced to minimize seal overpressure.

The dynamic seals 104 are each located in a groove in the bore that accommodates the plunger 100. The area between the dynamic seal chambers is a lubrication fluid port 122. Dynamic seal chamber #1 (the dynamic seal separating pumping media and clean lubricating fluid) and dynamic seal chamber #2 (with clean lubricating fluid on both sides of dynamic seal) are pressurized higher than the pumping pressure. The dynamic seal chambers 2–X (the higher number of seal chambers reduces the pressure differential at each seal) will see a predetermined pressure reduction (percentage, absolute value, etc.) to progressively step the pressure down. In an example implementation, the pressures are at +5%, −30%, −60% and −75% of the pump pressure.

The piston-style pressure compensator is used to control the pressure to each dynamic seal chamber (four shown in the figures). This is accomplished by having a fluid port 108 that is connected to the pressure pumping chamber at one end of the piston. Referring again to FIG. 2, the pressure pumping fluid acts on the end 112 of the piston 502 either directly or with a diaphragm "gauge protector." The piston 502 has a fixed geometry (i.e., diameter and surface area) on the pressure pumping fluid end 112 and a smaller diameter and surface area on the clean fluid end 114. The clean fluid end 114 has a port 122 connected to dynamic seal chamber #1. As the pressure pumping fluid pressure increases, the piston compensator, based on piston sizes, increases the pressure of the clean lubrication fluid, so that it exerts on the piston 502 a backside pressure higher than the pumping pressure. The number of pistons in the packing assembly is equal to the number of dynamic seal manifolds, and the number of dynamic seals is equal to the number of pistons plus 1 (S=P+1). In the embodiment shown herein, there are four pistons operating with four manifolds and five dynamic seals. Therefore, the seal packing assembly can be configured according to the pump configuration, desired application, and operating conditions.

Figure 9:
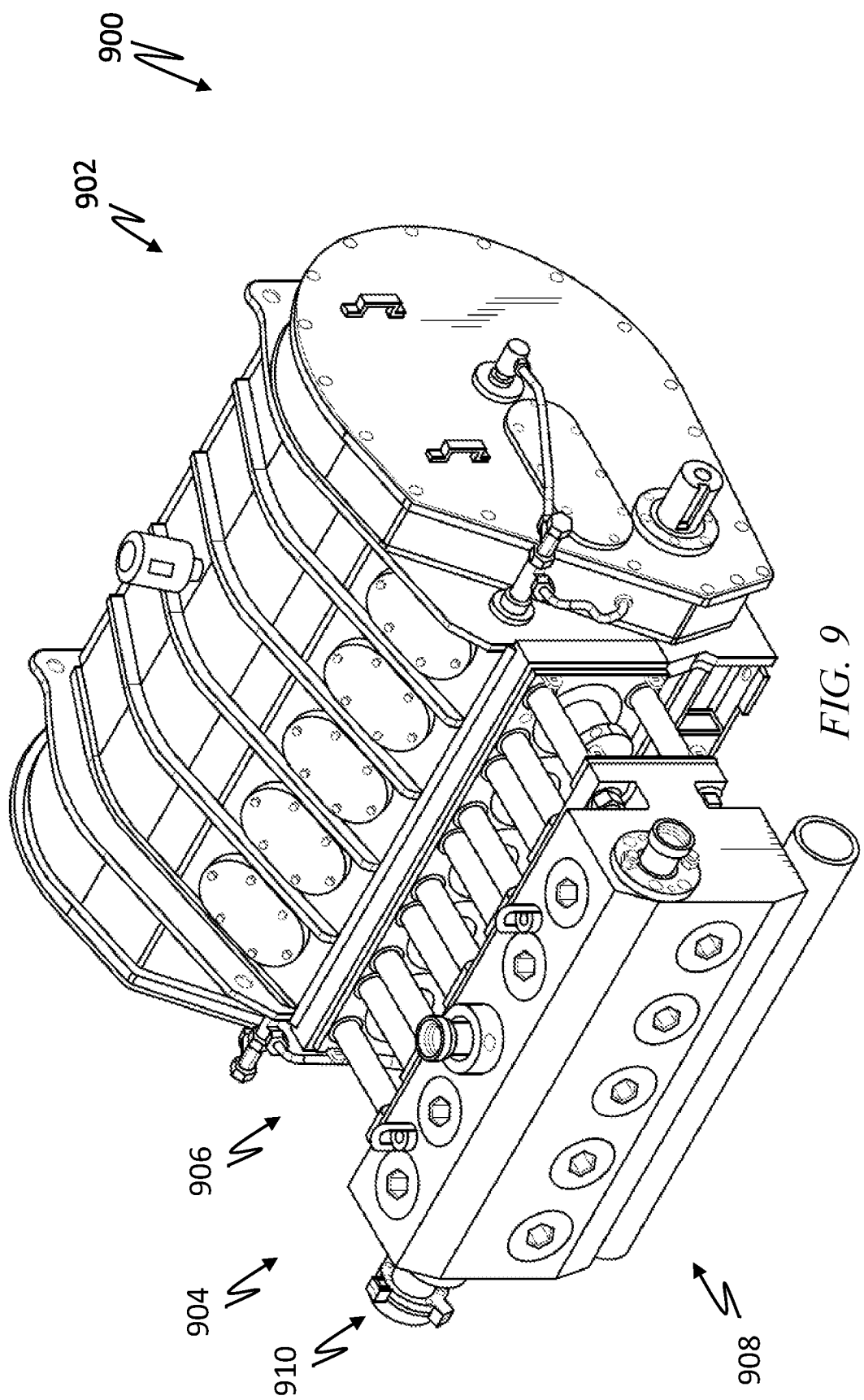
FIG. 9 is a perspective view of a positive displacement pump according to the teachings of the present disclosure.

FIG. 9 is a pictorial representation of an exemplary positive displacement pump 900 as an exemplary monitoring subject for the system and method described herein. The positive displacement pump 900 has two sections, a power end 902 and a fluid end 904. The fluid end 904 of the pump includes a fluid end block or fluid cylinder, which is connected to the power end housing via a plurality of stay rods 906. In operation, the crankshaft (not explicitly shown) reciprocates a plunger rod assembly between the power end and the fluid end 904. The crankshaft is powered by an engine or motor (not explicitly shown) that drives a series of plungers (not explicitly shown) to create alternating high and low pressures inside a fluid chamber. The cylinders operate to draw fluid into the fluid chamber from the suction manifold 908 and then discharge the fluid at a high pressure to a discharge manifold 910. The discharged liquid is then injected at high pressure into an encased wellbore. The injected fracturing fluid is also commonly called a slurry, which is a mixture of water, proppants (silica sand or ceramic), and chemical additives. The pump can also be used to inject a cement mixture down the wellbore for cementing operations. The pump may be freestanding on the ground, mounted to a skid, or mounted to a trailer.

The features of the present invention which are believed to be novel are set forth below with particularity in the appended claims. However, modifications, variations, and changes to the exemplary embodiments described above will be apparent to those skilled in the art, and the novel valve having a novel packing assembly for the fluid end described herein thus encompasses such modifications, variations, and changes and are not limited to the specific embodiments described herein.

What is claimed is:

1. A seal packing assembly for a plunger disposed within an annular bore to pump a pumping fluid in a fluid end of a hydraulic frac pump, comprising:
    a plurality of annular dynamic seals disposed within annular grooves circumferentially defined in the annular bore;
    a packing gland circumferentially housing a section of the plunger; and
    a plurality of seal manifolds distributed and defined within the packing gland, each seal manifold defining a port at one end exposed to the pumping fluid and further defining a clean lubrication fluid inlet proximate to a second end, the fluid inlet coupled to a lube pump via a check valve, where the clean lubrication fluid housed in the seal manifolds is maintained at a constant pressure, each seal manifold comprises:
        a piston disposed within the seal manifolds having a first end configured with a first surface area to interface with the pumping fluid and a second end configured with a second surface area to interface with the clean lubrication fluid; and
        a fluid port configured to provide fluid communication between the seal manifolds and the annular grooves of the annular dynamic seals.

2. The seal packing assembly of claim 1, wherein the number of pistons equals to the number of seal manifolds, and the number of dynamic seals equals to the number of pistons+1.

3. The seal packing assembly of claim 1, wherein the first surface areas of the pistons are unequal.

4. The seal packing assembly of claim 1, further comprising:
    a pressure sensor positioned within the annular bore and configured to measure pump fluid pressure therein; and
    a microprocessor configured to receive the pump fluid pressure and controllably adjust a lubrication pump coupled to the clean lubrication fluid inlet to supply the clean lubrication fluid at a constant pressure to the plurality of seal manifolds in response to the pump fluid pressure.

5. The seal packing assembly of claim 1, wherein each seal manifold further comprises at least one annular seal disposed about the piston to separate the pumping fluid from the clean lubrication fluids inside the seal manifolds.

6. The seal packing assembly of claim 1, wherein the plurality of pistons are disposed within the plurality of seal manifolds defined within a packing assembly housing and a piston cap securely fastened to the packing assembly housing.

7. The seal packing assembly of claim 1, wherein the plurality of dynamic seals are charged at different pressures due to the different piston second surface area being unequal between the plurality of pistons by maintaining a constant clean lubrication fluid pressure in the plurality of seal manifolds.

8. The seal packing assembly of claim 1, wherein the dynamic seals are charged at +5%, −30%, −60%, and −75% of the pump fluid pressure.

9. A seal packing assembly for a plunger disposed within an annular bore to pump a pumping fluid in a fluid end of a hydraulic pump, comprising:
    at least three annular dynamic seals disposed within annular grooves circumferentially defined in the annular bore;
    at least two annular seal chambers disposed between the at least three annular dynamic seals;
    a packing gland circumferentially housing a section of the plunger; and
    at least two seal manifolds distributed and defined within the packing gland, each seal manifold defining a port at one end exposed to the pumping fluid and further defining a clean lubrication fluid inlet proximate to a second end, the fluid inlet coupled to a lube pump via a high-pressure check valve, where the clean lubrication fluid housed in the seal manifolds is maintained at a constant pressure, each seal manifold comprises:
        a piston disposed within the seal manifold having a first end configured with a first surface area to interface with the pumping fluid and a second end configured with a second surface area to interface with the clean lubrication fluid; and
        a fluid port configured to provide fluid communication between the seal manifold and the at least two annular seal chambers; and
    wherein the pumping fluid-interfacing end of the at least two pistons of the at least two seal manifolds have different surface areas, and the fluid ports of the at least two seal manifolds are disposed between different annular dynamic seals.

10. The seal packing assembly of claim 9, wherein the number of pistons equals to the number of seal manifolds, and the number of dynamic seals equals to the number of pistons+1.

11. The seal packing assembly of claim 9, wherein the first surface areas of the pistons are unequal.

12. The seal packing assembly of claim 9, further comprising:
- a pressure sensor positioned within the annular bore and configured to measure pump fluid pressure therein; and
- a microprocessor configured to receive the pump fluid pressure and controllably adjust a lubrication pump coupled to the clean lubrication fluid inlet to supply the clean lubrication fluid at a constant pressure to the at least two seal manifolds in response to the pump fluid pressure.

13. The seal packing assembly of claim 9, wherein each seal manifold further comprises at least one annular seal disposed about the piston to separate the pumping fluid from the clean lubrication fluids inside the seal manifold.

14. The seal packing assembly of claim 9, wherein the at least two pistons are disposed within the at least two seal manifolds defined within a packing assembly housing and a piston cap securely fastened to the packing assembly housing.

15. The seal packing assembly of claim 9, wherein the at least three dynamic seals are charged at different pressures due to the different piston second surface area being unequal between the at least two pistons by maintaining a constant clean lubrication fluid pressure in the at least two seal manifolds.

16. The seal packing assembly of claim 9, wherein the dynamic seals are charged at +5%, −30%, −60%, and −75% of the pump fluid pressure.

17. A seal packing assembly for a plunger disposed within an annular bore to pump a pumping fluid in a fluid end of a hydraulic pump, comprising:
- a plurality of annular dynamic seals disposed within annular grooves circumferentially defined in the annular bore;
- a seal chambers disposed between each pair of the plurality of annular dynamic seals;
- a packing gland circumferentially housing a section of the plunger and the plurality of annular dynamic seals and seal chambers; and
- a plurality of seal manifolds distributed about the plunger and defined within the packing gland, each seal manifold defining a port at one end exposed to the pumping fluid and further defining a clean lubrication fluid inlet proximate to a second end, the fluid inlet coupled to a lube pump via a high-pressure check valve to provide a clean lubrication fluid to the seal manifolds at a constant pressure, each seal manifold comprises:
  - a piston disposed within the seal manifold having a first end configured with a first surface area to interface with the pumping fluid and a second end configured with a second surface area to interface with the clean lubrication fluid; and
  - a fluid port configured to provide fluid communication between the seal manifold and the annular seal chambers; and
- wherein the pumping fluid-interfacing end of respective pistons of the seal manifolds have different surface areas to create a differential pressure among the plurality of annular dynamic seals.

18. The seal packing assembly of claim 17, further comprising:
- a pressure sensor positioned within the annular bore and configured to measure pump fluid pressure therein; and
- a microprocessor configured to receive the pump fluid pressure and controllably adjust a lubrication pump coupled to the clean lubrication fluid inlet to supply the clean lubrication fluid at a constant pressure to the plurality of seal manifolds in response to the pump fluid pressure.

19. The seal packing assembly of claim 17, wherein each seal manifold further comprises at least one annular seal disposed about the piston to separate the pumping fluid from the clean lubrication fluids inside the seal manifold.

* * * * *